Patented July 3, 1928.

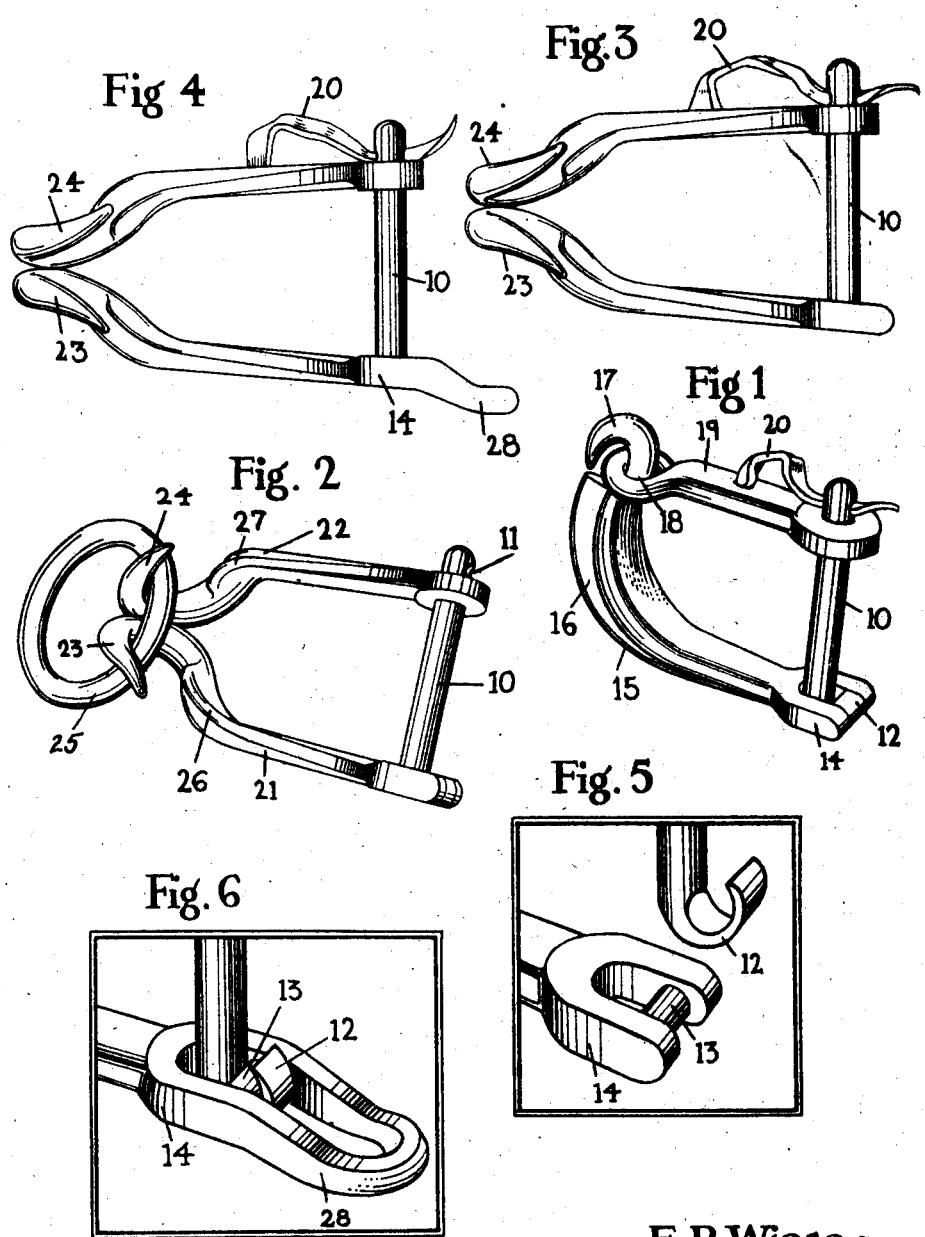

1,675,681

UNITED STATES PATENT OFFICE.

ERNEST PAUL WIESE, OF LINCOLN, NEBRASKA.

CLEVIS.

Application filed April 3, 1926. Serial No. 99,579.

My invention relates to clevises, its object being the provision of a clevis which is adaptable for use in its various forms in any place where a clevis is desired. It is a further object of my invention to provide a clevis which may be easily constructed, which is exceedingly simple in use and in which all of the parts remain attached whether the clevis is open or closed.

Having in view these objects and others which will be mentioned in the following description, I will now refer to the drawings, in which:

Figure 1 is a view in perspective showing one form of my clevis.

Figure 2 is a perspective view showing another form of my clevis.

Figure 3 is an elevational view of the clevis shown in Figure 2.

Figure 4 is a view in elevation of a clevis similar to that shown in Figures 2 and 3 but having one additional feature.

Figure 5 is a view in perspective of the end portions of the hinged parts of the form of my device shown in Figures 1, 2 and 3 before assembling.

Figure 6 is a view in perspective of the end portions of the hinged parts of the form of my device shown in Figure 4 after assembling.

Since the draft pin and its hinge are common to all forms of my clevis, I will describe these first. The draft pin is a rod of suitable length having an aperture 11 adjacent one of its ends and a hook member 12 at its other end. The hook member 12 as shown in Figure 5 is flattened on both its outside surface and on its inside surface, and the opening between the body portion of the rod and the extremity of the hook is such as to permit the pin 13 to enter. In assembling the hinged parts, the hook portion 12 of the pin 10 is caused to engage the pin 13, whereupon a blow from a hammer will cause the closing of the hook member 12 so as to prevent disengagement of these parts. The pin 13 is formed integral with the U-shaped end portion 14 in such a manner that when the hinge parts have been assembled the part 12 will be flush with the outer extremity of the part 14 as shown in Figure 1.

The clevis shown in Figure 1 has an L-shaped member 15 at one end of which the pin 10 is hinged in the manner above described. The member 15 is heavily ribbed at 16. At its upper end it is provided with a hook 17 for engaging an eye 18 of the member 19. It will be seen that the relation between the hook 17 and the eye 18 is also a hinged relation and that this hinge may also be locked by forming the hook 17 so that it can be passed through the eye 18 and then closed by a blow from a hammer. It should be noted that the hook 17 when closed has its outer surface practically continuous with the outer surface of the rib 16 so that there are no projections. The member 19 is provided with an aperture in its end portion opposite the eye 18, the aperture being adapted to receive the end of the pin 10. A small intermediate aperture is made in the member 19 in which a leather thong 20 may be fastened. This thong has its end loose so that after the clevis is closed the end of the thong may be passed through the aperture 11 to prevent accidental displacement during the jarring or vibration of the vehicle or implement.

The clevis shown in Figures 2 and 3 has two members 21 and 22, the member 21 corresponding in a general way to the member 15 and the member 22 being somewhat similar to the member 19. The relations of the members 21 and 22 to the pin 10 are identical with the relations of the members 15 and 19 to the pin 10. The member 21 has a hook 23 and the member 22 has a hook 24, the hooks being similar in form to each other and similar to the hook 17 shown in Figure 1. These two hooks may be caused to engage the ring 25 as shown in Figure 2 and then closed by striking their ends with a hammer. As in the Figure 1 construction the members 21 and 22 are heavily ribbed at 26 and 27 respectively for strengthening purposes. Likewise the member 22 which releasably receives the end of the pin 10 is provided with an aperture into which a thong 20 is secured. The construction shown in Figure 2 merely illustrates the application of that construction to a ring but the clevis may be applied for other purposes. Two clevises may be secured to the ring 25 for three or four horse eveners, but regardless of the variations in structure the parts are all unloseable.

The clevis shown in Figures 4 and 6 differs from that of Figures 2 and 3 only in the closed projection 28. This projection is useful in that it forms a loop for securely receiving a stay chain.

The clevis is made from malleable iron or from any other suitable material which may be bent to form the two hinged parts and which is sufficiently strong to withstand the strains. It is made preferably by casting, and in this connection it is to be noted that all parts may be easily cast without a core or without necessitating any of the more complicated casting processes. The link 15 in Figure 1 is made by first casting it with the bifurcated portion 14 in the same plane with that of the hook 17, the link being given a quarter twist at the neck of the bifurcated portion to position the parts as shown in Figure 1. All of the other parts shown in the drawings may be taken out of the mold in the form shown in the drawings. The clevis is characterized by its rigid construction throughout and by the absence of springs or other complicated parts which are apt to give way in use and which thus prove to be a constant source of annoyance.

Having thus described my invention in such full, clear, and exact terms that its construction and operation will be readily understood by others skilled in the art to which it pertains, what I claim as new and desire to secure by Letters Patent of the United States is:

1. A clevis having a horizontal portion and a vertical portion and a curved portion connecting said horizontal and vertical portions, said three portions being of integral construction, a rib projecting outwardly from said curved portion and from said vertical portion, said horizontal portion being provided with an opening and having a transverse pin therein, a clevis pin seated in the opening in said horizontal portion and having an outwardly curled tongue embracing said transverse pin, and a flat link having an eye adjacent one extremity thereof, said vertical portion terminating in an outwardly curled tongue hingedly engaging said link through the eye thereof, said link being provided with an aperture for receiving said clevis pin.

2. A clevis having a horizontal portion and a vertical portion and a curved portion connecting said horizontal and vertical portions, a rib projecting outwardly from said curved portion and said vertical portion, a fork at the outer extremity of said horizontal portion, a pin in said fork and integral therewith, the outer extremity of said vertical portion terminating in an outwardly curled tongue forming a loop, a flat link having a loop at one extremity for engaging said curled tongue, a clevis pin having one of its extremities seated within said fork and having a flattened curled tongue embracing the pin of said fork, and means for detachably securing the outer end portion of said link to said clevis pin in a manner such that the outer end portion of said link will be freely slidable on said clevis pin.

In testimony whereof I affix my signature.

ERNEST P. WIESE.